United States Patent
Choque et al.

(10) Patent No.: US 10,846,594 B2
(45) Date of Patent: Nov. 24, 2020

(54) SYSTEMS PROVIDING A LEARNING CONTROLLER UTILIZING INDEXED MEMORY AND METHODS THERETO

(71) Applicant: Capital One Services, LLC, McLean, VA (US)

(72) Inventors: Omar Florez Choque, McLean, VA (US); Erik Mueller, McLean, VA (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

(21) Appl. No.: 16/250,272

(22) Filed: Jan. 17, 2019

(65) Prior Publication Data

US 2020/0234134 A1   Jul. 23, 2020

(51) Int. Cl.
  *G06N 3/08* (2006.01)
  *G06N 20/00* (2019.01)
  *H04L 9/06* (2006.01)

(52) U.S. Cl.
  CPC ............ *G06N 3/084* (2013.01); *G06N 20/00* (2019.01); *H04L 9/0643* (2013.01)

(58) Field of Classification Search
  CPC ....... G06N 3/084; G06N 20/00; H04L 9/0643
  See application file for complete search history.

(56) References Cited

U.S. PATENT DOCUMENTS

| 9,264,451 | B2* | 2/2016 | Chari ...................... H04L 63/20 |
| 2010/0318478 | A1* | 12/2010 | Yoshiike ................ G06N 3/006 706/12 |
| 2018/0189676 | A1* | 7/2018 | Predovic ................ G06Q 10/10 |

OTHER PUBLICATIONS

A. Long, "A bunch of tips and tricks for training deep neural networks", 2018 (Year: 2018).*
J. Oh, "Efficient Deep Reinforcement Learning via Planning, Generalization, and Improved Exploration", 2018 (Year: 2018).*
H. Yin, et al., "Hashing over Predicted Future Frames for Informed Exploration of Deep Reinforcement Learning", 2018 (Year: 2018).*
S. Wiedemann, et al., "Entropy-Constrained Training of Deep Neural Networks", 2018 (Year: 2018).*

(Continued)

*Primary Examiner* — Kamran Afshar
*Assistant Examiner* — Ryan C Vaughn
(74) *Attorney, Agent, or Firm* — Troutman Pepper Hamilton Sanders LLP; Christopher J. Forstner; John A. Morrissett

(57) ABSTRACT

A system includes one or more memory devices storing instructions, and one or more processors configured to execute the instructions to perform steps of a method. A method can include receiving observations and a corresponding class label, determining a candidate key based on the observations, determining a current memory state of a memory module based on a similarity of stored keys to the candidate key, generating a measurement vector based on the current memory state, concatenating the candidate key and measurement vector to form a state vector, determining, based on the state vector and an action distribution policy, an action of a plurality of actions such that the determined action maximizes an expected reduction in entropy as compared to the remaining actions of the plurality actions, executing the determined action, determining a value of the determined action, and update, based on the value, the action distribution policy.

12 Claims, 5 Drawing Sheets

(56) References Cited

OTHER PUBLICATIONS

Silver et al., "Deterministic Policy Gradient Algorithms," in Proc. 31st Intl. Conf. Machine Learning (2014). (Year: 2014).*
Liang et al., "Deep Variation-structured Reinforcement Learning for Visual Relationship and Attribute Detection," in Proc. IEEE Conf. Computer Vision and Pattern Recognition 848-57 (2017). (Year: 2017).*
Arel et al., "Reinforcement Learning-Based Multi-Agent System for Network Traffic Signal Control," in 4.2 IET Intelligent Transport Sys. 128-35 (2009). (Year: 2009).*
Santoro et al., "Relational Recurrent Neural Networks," in Advances in Neural Info. Processing Sys. 7299-7310 (2018). (Year: 2018).*
Frady et al., "A Theory of Sequence Indexing and Working Memory in Recurrent Neural Networks," in 30.6 Neural Computation 1449-1513 (2018). (Year: 2018).*
Wayne et al., "Unsupervised Predictive Memory in a Goal-Directed Agent," in arXiv preprint arXiv:1803.10760 (2018). (Year: 2018).*
Bahdanau, D. et al., Neural Machine Translation by Jointly Learning to Align and Translate, ICLR 2015; May 19, 2016.
Goodfellow, I. et al., Generative Adversarial Nets, Department d'informatique et de recherche operationnelle, Universite de Montreal; Jun. 10, 2014.
Ioffe, S. et al., Batch Normalization: Accelerating Deep Network Training by Reducing Internal Covariate Shift; Mar. 2, 2015.
Johnson, M. et al., Google's Multilingual Neural Machine Translation System: Enabling Zero-Shot Translation; Aug. 21, 2017.
Kaiser, L. et al., Learning to Remember Rare Events, ICLR 2017; Mar. 9, 2017.
Kingman, D. et al., Adam: A Method for Stochastic Optimization, ICLR 2015; Jan. 30, 2017.
Kirkpatrick, J. et al., Overcoming catastrophic forgetting in neural networks, DeepMind, London, UK, Bioengineering Depoartment, imperial College London; Jan. 25, 2017.
Koch, G. et al., Siamese Neural Networks for One-shot Image Recognition, Department of Computer Science, University of Toronto; 2015.
Krizhevsky, A. et al., ImageNet Classification with Deep Convolutional Neural Networks; Jun. 2017.
Lake, B. et al, One shot learning of simple visual concepts, Department of Brain and Cognitive Sciences, Massachusetts Institute of Technology; 2011.
Mnih, V. et al., Asynchronus Methods for Deep Reinforcement Learning; Jun. 16, 2016.
Pauleve, L. et al., Locality sensitive hashing: a comparison of has function types and querying mechanisms, HAL archives-ouvertes; Apr. 16, 2010.
Qian, N., On the Momentum Term in Gradient Descent Learning Algorithms, Neural Networks; Jan. 1999.
Qian, Q. et al., Distance Metric Learning Using Dropout: A Structured Regularization Approach, KDD '14 Proceedings of the 20th ACM SIGKDD international conference on Knowledge discovery and data mining, Aug. 2014.
Santoro, A. et al., Meta-Learning with Memory-Augmented Neural Networks, ICML'16 Proceedings of the 33rd International Conference on International Conference on Machine Learning—vol. 48, pp. 1842-1850; Jun. 2016.
Vinyals, O. et al., Matching Networks for One Shot Learning, NIPS'16 Proceedings of the 30th International Conference on Neural Information Processing Systems, pp. 3637-3645; Dec. 2016.
Wei, Z. et al., Reinforcement Learning to Rank with Markov Decision Process, SIGIR'17; Aug. 2017.
Williams, R. et al., Simple Statistical Gradient-Following Algorithms for Connectionist Reinforcement Learning, Machine Learning, 8, pp. 229-256; 1992.
Zhu, S. et al., Multi-labelled Classification Using Maximum Entropy Method, SIGIR'05; Aug. 2005.

\* cited by examiner

Learning with a multi-layer perceptron model (MLP)

Learning to hash

SYSTEMS PROVIDING A LEARNING CONTROLLER UTILIZING INDEXED MEMORY AND METHODS THERETO The present disclosure relates generally to a system implementing a computer model in which learning, such as through automatic and continuous and/or iterative retraining of the model, can be achieved with the use of a hash index.

BACKGROUND

Various applications utilize machine learning to enable a computer system to progressively improve performance on a task. Machine learning is sometimes divided into two separate phases. The first phase involves the training of a model. Once the model is adequately, trained, the model is applied to some application or task, with the aim that the model will adequately improve in performance over time. Generally, models are limited in the application phase to only those classes that were including during the training phase. That is, typical existing models and techniques are unable to add classes to the model without complete retraining of the model. This can be problematic as retraining a model can be a laborious, time-consuming, and resource-intensive process, which may require human intervention to retrain the model. Moreover, in some cases, smaller classes can be subsumed within a larger class (e.g., if the smaller class does not have sufficient observations in the training data).

Accordingly, there is a need for improved devices, systems, and methods that can dynamically add new classes to a model without requiring retraining of the model.

SUMMARY

Disclosed embodiments provide systems and methods for providing a continuously learning model configured to maximize the reduction of expected entropy in predicted results when receiving a data input, which can include dynamically adding new classes to the model without requiring traditional model training or retraining.

Consistent with the disclosed embodiments, the disclosed technology may include a continuously learning controller configured to learn from an indexed memory, which may, in some embodiments, decouple a prediction module or function from a memory management module or function. According to some embodiments, the system may include one or more memory devices storing instructions and one or more processors configured to execute the instructions to automatically retrain of the model with the use of a hash index. The system may execute the instructions to receive input data, such as a set of observations, and the system may be configured to determine a class label corresponding to the set of observations. To determine the corresponding class label, the system may generate a candidate key based on an embedding vector determined from the observations, and the system may determine whether any stored keys in a stored key vector are similar to the candidate key. The key vector, as well as a value vector and an age vector, may be stored in a memory module, and the system may determine a current memory state of the memory module. The system may generate a measurement vector based on the current memory state, normalize the candidate key and the measurement vector, and concatenate the candidate key and measurement vector to form a state vector. The system may evaluate a policy function based on an action distribution policy and the state vector, to select an action of a plurality of actions, and the system may execute the selected action. The system may determine a value of the selected action, and the system may update the action distribution policy based on the determined value.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1A:
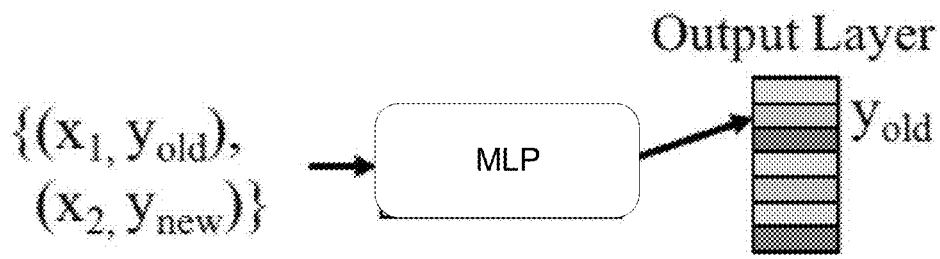
FIG. 1A is a representation of an existing model methodology.

Throughout this disclosure, certain example embodiments are described in relation to systems and methods for providing a trainable controller configured to learn from an indexed memory. But embodiments of the disclosed technology are not so limited. In some embodiments, the disclosed technology may be effective in decoupling a prediction module or function of the system from a memory management module or function of the system. In some embodiments, the disclosed technology may be effective in maximizing a predicted system entropy reduction. Those having skill in the art will recognize that the disclosed technology can be applicable to multiple scenarios and applications.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for providing a trainable controller configured to learn from an indexed memory. In some embodiments, the trainable controller may be configured to incrementally register new classes of data that emerge over time without a need to retrain the model employed by the controller or any changes to network topology. Thus, according to some embodiments, the disclosed technology may provide a system configured to continually learn, which has been a challenge for existing systems and methods.

Although various embodiments may be described with respect to a system, a non-transitory computer-readable medium, and a method, it is contemplated that embodiments with identical or substantially similar features may alternatively be implemented as methods, systems, and/or non-transitory computer-readable media.

Reference will now be made in detail to example embodiments of the disclosed technology, examples of which are illustrated in the accompanying drawings and disclosed herein. Wherever convenient, the same references numbers will be used throughout the drawings to refer to the same or like parts.

Figure 1B:
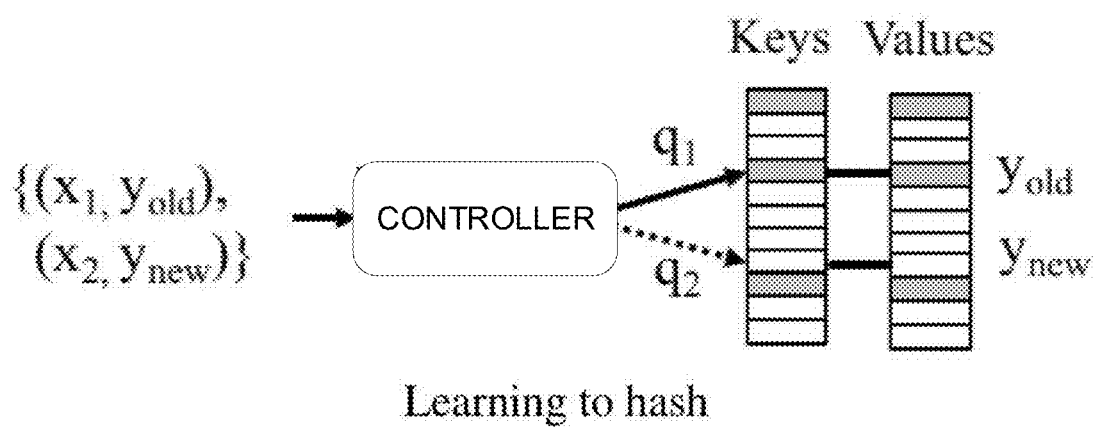
FIG. 1B is a representation of an example model methodology applied by an example system including a learning controller, in accordance with some embodiments.

Referring to FIG. 1A, related art technologies typically include a fixed-length output layer, which cannot register a new class (e.g., $y_{new}$). In contrast, as depicted in FIG. 1B, embodiments of the disclosed technology can use a hash structure with fewer keys than observations, producing collisions to various classes to predict an index for a new class (e.g., $y_{new}$) in the set of available entries of the hash structure. Thus, the newly registered or indexed class (e.g., $y_{new}$) can become an observed class for subsequent collisions, resulting in the index incrementally learning new classes. As will be appreciated, existing systems and methods generally strive to reduce or mitigate collisions when implementing a hash structure, whereas the disclosed technology purposely produces collisions to provide adequate generalization of classes. Thus, related art systems and method teach away from the use of collisions, which embodiments of the present disclosure may leverage for improved learning.

Figure 2:
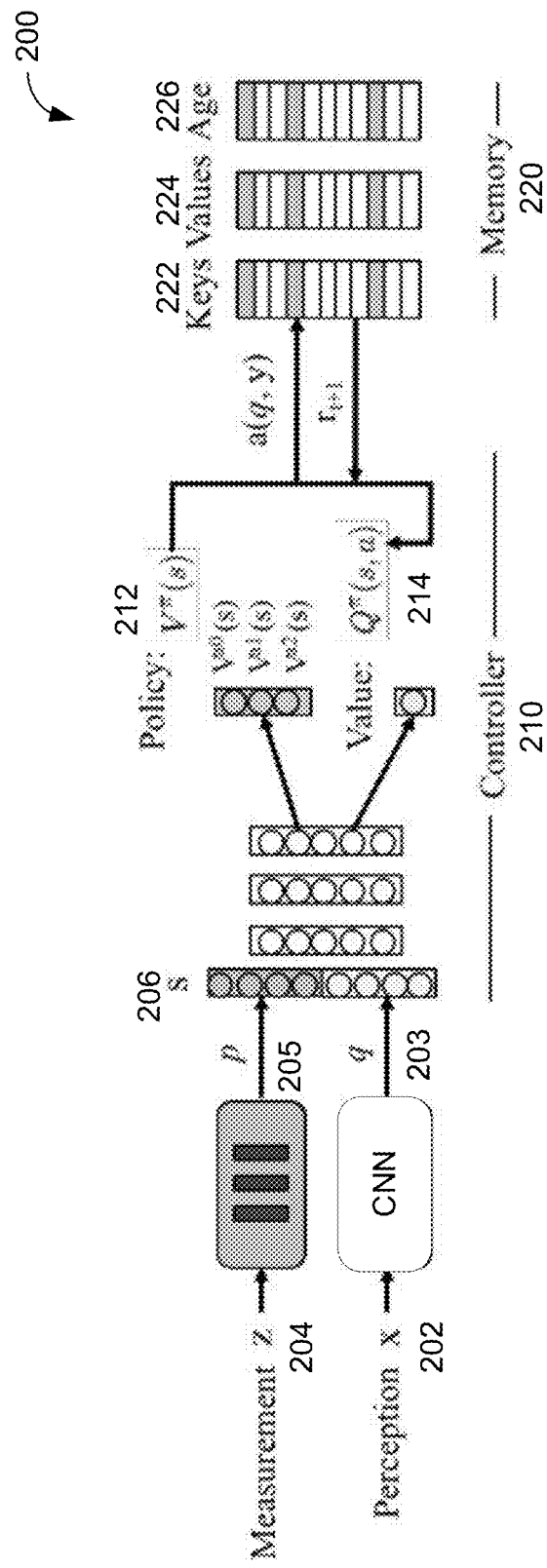
FIG. 2 is a representation of an example system including a learning controller, in accordance with some embodiments.

Referring to FIG. 2, some embodiments can comprise a system 200 including a controller 210 and a memory module 220. The memory module 220 can include three vectors: a key vector (K) 222, a value vector (V) 224, and an age vector (A) 226. The key vector 222 (e.g., an array) can be configured to store hash keys, the value vector 224 (e.g., an array) can be configured to store class labels corresponding to respective hash keys of the key vector 222, and the age vector 226 (e.g., an array) can be configured to store age information corresponding to respective hash keys of the key vector 222. In some embodiments, each key can have a dimensionality of key_dim, and the corresponding values stored in the value vector 224 and the age vector 226 can be integers. In some embodiments, the controller 210 can be configured to incrementally increase values in the age vector 226 as time passes, such that an age of the corresponding hash key can be provided. According to some embodiments, the memory module 220 can be defined as:

$$M = (K_{mem\_size \times key\_dim}, V_{mem\_size}, A_{mem\_size}) \quad (1)$$

As training progresses, new classes can be incrementally allocated to the key vector 222, value vector 224, and age vector 226 such that each vector may grow in size over time. Similarly, as a trained model processes new input, new classes can be incrementally allocated to the key vector 222, value vector 224, and age vector 226 such that each vector may grow in size over time.

In some embodiments, the system 200 may be configured to maximize the reduction of expected entropy in predicted results of a data input 202 (e.g., un-labeled samples and/or raw data). As will be appreciated, the data input 202 may also be referred to as observations $x_i$ 202, and the system 200 may be configured to determine a class label $y_i$ corresponding to the observations $x_i$ 202, as will be discussed more fully below. In some embodiments, the controller 210 can receive the observations $x_i$ 202 and can generate an embedding vector $q_i$ 203 based on the observations $x_i$ 202. Embedding vector q 203 may be representative of the data embedded in each observation $x_i$ 202.

The controller 210 may be configured to learn to predict which action (a) of a predetermined list of actions is most appropriate for maximizing reduction of expected entropy in predicted results when receiving a data input 202. That is, the controller 210 may be configured to receive a data input 202 and determine which action to be performed in relation to the raw data input 202 is most likely to maximize a reduction of expected entropy in predicted results. In some embodiments, the predetermined list of actions may include read and write access actions. In some embodiments, the predetermined list of actions may include three actions: query 302, update 304, and insert 306.

Figure 3:
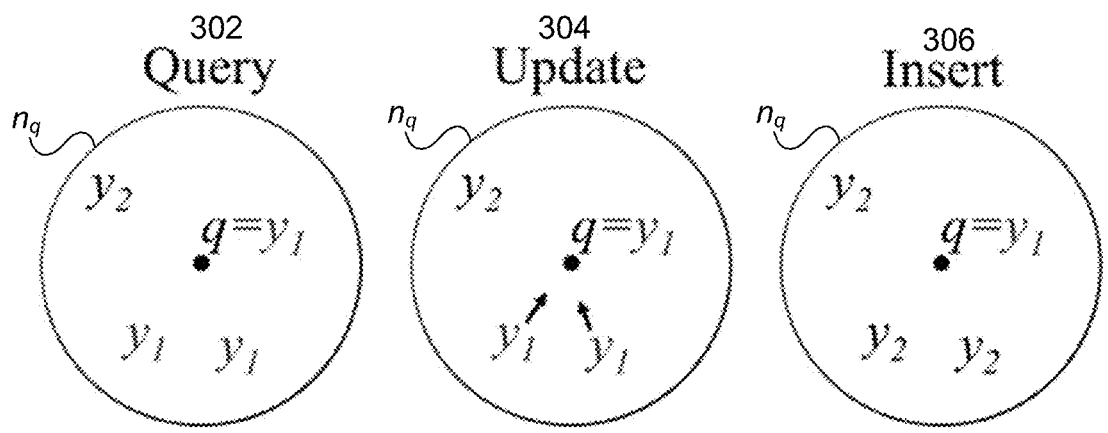
FIG. 3 is a representation of example actions that can be performed by a controller of an example system, in accordance with some embodiments.

In some embodiments, controller 210 can be configured to increment the age vector by one each time controller 210 executes a query 302 function, and in some embodiments, controller 210 can be configured to set the age equal to zero when controller 210 executes an update 304 function or an insert 306 function. FIG. 3 provides a representation what occurs in the memory module 220 when the controller 210 performs each of these actions for an input vector q 203 and a corresponding class label $y_1$. The initial operation for each of the query 302, update 304, and insert 306 actions is query(q), which can retrieve a neighborhood $n_q$ around the vector q. Neighborhood $n_q$ can be a set of elements similar in content to embedding vector q 203. The controller 210 can determine the similarity of embedding vector q 203 and the elements of neighborhood $n_q$ by executing a distance function such as, for example and not limitation, a Cosine distance function. The controller 210 can then evaluate whether the neighborhood $n_q$ includes a cache hit or a cache miss. As shown in the update 304, if there is a cache hit (i.e., neighborhood $n_q$ includes entries that match the class label $y_1$), the controller 210 can update entries indexed in neighborhood $n_q$ that match the class label $y_1$, which can change the keys for dimensions in which the keys point in a different direction than vector q. That is, the controller 210 can update the keys that match the class label $y_1$ in the direction of embedding vector q 203. Alternately, if there is a cache miss (i.e., neighborhood $n_q$ does not include an entry that matches the class label $y_1$), the controller 210 can insert the class label $y_1$ into the current neighborhood $n_q$.

More specifically, query action 302 can predict the probability of reading a particular entry in the value vector 224 (e.g., class label $y_1$). In some embodiments, query action 302 (e.g., query(q)) does not change the memory state of memory module 220. In some embodiments, query action 302 can be implemented as a k-nearest neighbor search. In some embodiments, query action 302 can be implemented as any query or search action that is differentiable. The k-nearest neighbor search can return, in decreasing order, the keys of key vector 222 that maximize the softmax of the dot product with q, which may be expressed as:

$$\text{query}(q) = \text{argmax}_i \{\text{softmax}(q \cdot K[i])\} \quad (2)$$

In some embodiments, both vector q 203 and K[i] are L1-normalized, such that the inner product of vector q 203 and K[i] is the cosine similarity between them. In some embodiments, k (of the k-nearest neighbor search) can be set to k=256, but other values of k are contemplated. In some embodiments, the value of k can be approximately one-tenth of the total memory size of memory module 220 or one-tenth of the number of entries in memory module 220. In some embodiments, any normalization method transforming the length of this vector to 1 can be used. For example, L1, L2, etc. regularization can be used:

$$L^1 = \sum_{i=1}^{n} |x_i| \quad (3)$$

$$L^2 = \sqrt{\sum_{i=1}^{n} x_i^2} \quad (4)$$

$$L^\infty = \max(|x_i|) \quad (5)$$

Turning to the update action 304 (e.g., update(q, $y_1$)), it should be noted that memory module 220 is volatile, as the hash keys stored in memory module 220 evolve over time, trying to map similar observations to the same memory entry. As described above, the update action 304 can read the memory module 220 (e.g., using the query(q) operation) to return a neighborhood of similar keys K[$n_q$]. Responsive to determining that neighborhood $n_q$ includes a cache hit (e.g., class label $y_1$, which corresponds to vector q 203, is found in neighborhood $n_q$), the controller 210 can update the matching keys K[$n_{q+}$] to better reflect vector q 203. In some embodiments, the controller 210 can update the matching keys K[$n_{q+}$] according to the sum between a fraction of the matching keys K[$n_{q+}$] and vector q 203:

$$K[n_{q+}] = \frac{\alpha K[n_{q+}] + q}{\|\alpha K[n_{q+}] + q\|}, A[n_{q+}] = A[n_{q+}] + 1 \quad (6)$$

Figure 4:
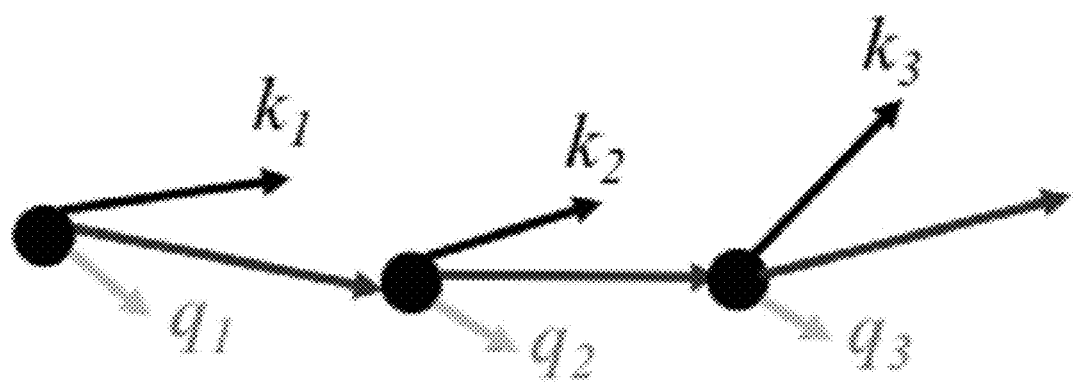
FIG. 4 is representation of an iterative updating process of class labels, in accordance with some embodiments.

In some embodiments, α can resemble a momentum factor, and in some embodiments, α can be restricted to 0≤α<1 to ensure stability of the hash keys stored in memory module 220. As will be appreciated, without stability, the hash keys may grow to vectors having inappropriately large numbers or inappropriately small numbers close to zero. Numerical stability may permit the key K[i] to influence vector q 203 during certain operations, for example. In some embodiments, the value of the key K[i] may have a norm of 1. In some embodiments, the key K[i] may be considered inappropriately large if it has a value larger than 1. In some embodiments, the key K[i] having a value between 0 and 1 may correspond to numerical stability. By iteratively updating hash keys, the system 200 can provide a continual learning regime, and as depicted in FIG. 4, incremental vectors $q_i$ 203 can be updated (e.g., via $k_n$) to move toward more stable representations of class labels.

Referring now to insert action 306 (e.g., insert(q, $y_1$)), subsequent to performing the query(q) operation and determining there is a cache miss (i.e., neighborhood $n_q$ does not include an entry that matches the class label $y_1$), the controller 210 can insert the class label $y_1$ into the current neighborhood $n_q$. The controller 210 can then retrieve, based on the values stored in the age vector 306, a subset of the oldest entries, and the controller can randomly sample an index $n_{oldest}$. In some embodiments, the controller 210 can retrieve the oldest value stored in the age vector 306 without random sampling. In some embodiments, if the controller 210 determines that all entries have the same age, the controller 210 can randomly choose a subset of entries. Regardless of how the index $n_{oldest}$ is determined, in some embodiments, the controller 210 can write the hash key (e.g., vector q 203) in K[$n_{oldest}$] and the corresponding value (e.g., ($y_1$)) in K[$n_{oldest}$]. The controller can also set A[$n_{oldest}$] equal to zero. Because the disclosed technology implements continuous/iterative learning, it may be assumed that the most recent entries are more important or more accurate as compared to older entries. Accordingly, it may be advantageous to remove or overwrite older entries (as compared to newer entries, which are assumed to be more valuable), as necessary.

Writing (e.g., insert(q, $y_1$)) in the returned position (e.g., index $n_{oldest}$) may change the key distribution of the hash index. To maintain efficiency, the controller 210 may insert new classes or values into value vector 224 and/or new hash keys into key vector 222 according to a similar or constant distribution. Alternately, if the distribution changes, the model may have to be retrained according to traditional model teaching methods. To avoid the need for traditional teaching methods, the controller 210 can apply a policy π that provides a distribution of the query action 302 (e.g., returning k-nearest neighbors), the update action 304 (e.g., updating colliding keys), and the insert action 306 (e.g., insert a query q). In other words, the controller 210 can learn to predict to query 302, update 304, or insert 306 by applying the policy π.

In some embodiments, the controller 210 can receive input data including perceptions or observations x 202 and determine a class label $y_i$ for each set of observations $x_i$. In some embodiments, the controller 210 can store the input data at a memory or storage location. In some embodiments the controller 210 can determine whether any stored keys in the key vector 222 are similar to the candidate key, such as by executing query(q) to determine a neighborhood $n_q$.

In some embodiments, the controller 210 can determine a current memory state z 204 of the memory module 220. This can be useful because the quality of the hash key rankings can depend on the performance of the controller 210, the performance of the controller 210 can be optimized by reducing the entropy of the system 200, and to reduce the entropy of the system 200, the system 200 can track the memory state z 204 of the memory module 220 and use this memory state z 204 to influence execution of the policy function V' 212. As will be appreciated, the hash key ranking may refer to a similarity ranking measured, for example, by a calculated cosine distance between hash keys of the same class. To maximize this behavior, the controller 210 may be configured to penalize the entropy when calculating a query action 302 (e.g., the reward $r_t$, as discussed below).

In some embodiments, the matching keys (e.g., K[query ($n_q$)]) can represent the current memory state z 204 of the memory module 220 before the controller 210 performs any action a (e.g., query 302, update 304, insert 306). According to some embodiments, the controller 210 can determine an average vector based on the matching keys K[query($n_q$)] to determine the current memory state z 204 of the memory module 220. In some embodiments, the controller 210 can generate a measurement vector p 205 based on the memory state z 204.

In some embodiments, the controller 210 can normalize vector q 203 and vector p 205, which may facilitate memory operations. In some embodiments, the controller 210 can concatenate normalized vector q 203 and normalized measurement vector p 205 to form state vector s 206 for subsequent processing.

For each time step t, the controller 210 can receive the state $s_t$ and can execute an action from a set of possible operations (e.g., A={query($q_t$), update($q_t$, $y_t$), insert ($q_t$, $y_t$)} according to the policy π, which, as described above, is a distribution of probabilities over action $a_t$ given state $s_t$. That is, the controller can determine, based on the state $s_t$, the action of a plurality of actions that is expected to maximize a reduction in entropy of the system 200, which directly corresponds to an expected increase in performance and accuracy of the system.

To determine the expected reward or expected reduction in entropy, in some embodiments, the controller 210 can receive a scalar reward $r_t$ that is proportional to the reduction of normalized entropy in the query results right after the controller 210 executes action $a_t$. The entropy can be defined as:

$$\text{entropy}(x) = -\sum_i \frac{P(x_i)\log(P(x_i))}{\log|x|} \quad (7)$$

$$r_t = 1 - \text{entropy}(\text{softmax}(q_t \cdot K[\text{query}(n_q)])) \quad (8)$$

In some embodiments, the reward $r_t$ can be a scalar in the range [0, 1], and the value of the reward $r_t$ can represent the penalty for interactions that produce uncertainty (e.g., $r_t$<0.5) or the encouragement of memory operations that assign a greater likelihood to fewer classes, resulting in more informative and reliable predictions (e.g., $r_t$>0.5). While a cutoff of $r_t$=0.5 is discussed herein, in some embodiments, the value of $r_t$ can be adjusted to be more sensitive to noise and/or uncertainty, such as by setting the value of $r_t$ to a value nearer to zero.

The controller 210 may be configured to maximize the reduction of expected entropy in predicted results by accessing the memory module 220 with read or write operations for each state vector $s_t$ 206. In some embodiments, the total discounted reward $R_t$ can be reaccumulated reward from time step t with discount factor γ and can be represented as $$R_t = \sum_{k=0}^{\infty} \gamma^k r_{t+k} \quad (9)$$

where discount factor γ is an external and predetermined value that favors recent rewards as it decays over time.

In some embodiments, after the controller 210 has executed the policy function $V^\pi(s_t)$ 212 to determine which action a to select given a particular state $s_t$, in some embodiments, the controller can evaluate the value function $Q^\pi(s_t, a_t)$ 214 to determine the success of action $a_t$ by computing the expected total reward $R_t$ at the particular state $s_t$. The controller can then update the policy π based on the results determined from the value function $Q^\pi(s_t, a_t)$ 214. Stated otherwise, the controller 210 can evaluate the value function $Q^\pi(s_t, a_t)$ 214 and update the policy π to incorporate the results of that value function 214 evaluation to maximize the decrease in entropy of the system 200 in future iterations of the policy function $V^\pi(s_{t+1})$ 212.

In some embodiments, the controller 210 can evaluate the policy function $V^\pi(s_t)$ 212. Some embodiments can include a neural network in communication with the controller 210. In some embodiments, the neural network can be configured to directly parameterize the policy function $V^\pi(s_t)$ 212, which selects actions given its current state. Thus, the policy can be represented as $$\pi(a_t|s_t;\theta) \quad (10)$$

where θ corresponds to parameters of the policy π. The parameters of policy π may refer to weights of the neural network implementing controller 210. To facilitate advancement and increased accuracy of the policy π, the controller 210 can perform a back-propagation calculation or other calculations to weight the reduction in entropy in the system 200. For example, the controller can calculate a gradient ascent to determine updates for parameters θ. In some embodiments, the controller 210 can determine updates for parameters θ in the expected return of the total reward E[$R_t$] by, for example, approximating the unbiased estimation of $\nabla_\theta E[R_t]$ in the direction $$\nabla_\theta A(s,a) \cdot \log \pi(a_t|s_t;\theta) \quad (11)$$

where A(s, a) is a scalar value measuring the advantage of taking action $a_t$ in state $s_t$. In some embodiments, the controller can approximate the unbiased estimation of $\nabla_\theta$E [$R_t$] using the REINFORCE algorithm, algorithms corresponding to Policy Networks, or algorithms corresponding to Actor-Critic networks (e.g., Actor-Critic algorithms).

According to some embodiments, the scalar value of A(s, a) can be represented and/or computed as $$A(s,a)=Q(s,a)-V(s)=r+\gamma V(s')-V(s) \quad (12)$$

where the discount factor γ is a predetermined value and s' is the next state if action a is taken. That is, s' represents the set of keys that will be obtained by taking action a. And as will be appreciate, the value function $$Q^\pi(s,a)=E[Rt|s_t=s,a] \quad (13)$$

corresponds to the expected return for selecting action $a_t$ in state $s_t$ and following policy π. The expected return value can be approximated with parameters θ, and the controller 210, as described above, can update the parameters θ. In some embodiments, the controller 210 can compute updates to the parameters θ by minimizing the loss function:

$$E[r+\gamma\max_{a_t+1}Q(s_{t+1},a_{t+1};\theta)-Q(s_t,a_t;\theta)^2] \quad (14)$$

where $s_t$ and $s_{t+1}$ correspond to two consecutive states transitioned with an action $a_t$ (i.e., $s_t \to a_t \to s_{t+1}$), providing the return $$\gamma\max_{a_t+1}Q(s_{t+1},a_{t+1};\theta) \quad (15)$$

In some embodiments, the disclosed technology may include one or more memory devices storing instructions and one or more processors configured to execute the instructions to perform steps of a method. Specifically, in some embodiments, the method may include receiving input data, which can include a set of observations. The method may include generating a candidate key or an embedding vector based on the observations and determining whether any stored keys in a stored key vector are similar to the candidate key. In some embodiments, the key vector, as well as a value vector and an age vector, can be stored in a memory module, and the method can include determining a current memory state of the memory module, generating a measurement vector based on the current memory state, normalizing the candidate key and the measurement vector, and concatenating the candidate key and measurement vector to form a state vector. The method may include evaluating a policy function based on an action distribution policy and the state vector, to select an action of a plurality of actions. In some embodiments, the method may include executing the selected action. In some embodiments, the method may include determining a value of the selected action updating the action distribution policy based on the determined value, such that the action distribution policy may be improved for future iterations.

In some embodiments, the disclosed technology may include a non-transitory, computer-readable medium storing instructions that, when executed by one or more processors, cause a system to perform steps of a method. Specifically, in some embodiments, the one or more processors may execute the instructions to receive input data, which can include a set of observations. The one or more processors may execute the instructions to generate a candidate key or an embedding vector based on the observations and determine whether any stored keys in a stored key vector are similar to the candidate key. In some embodiments, the key vector, as well as a value vector and an age vector, can be stored in a memory module, and the one or more processors may execute the instructions to determine a current memory state of the memory module, generate a measurement vector based on the current memory state, normalize the candidate key and the measurement vector, and concatenate the candidate key and measurement vector to form a state vector. The one or more processors may execute the instructions to evaluate a policy function based on an action distribution policy and the state vector, to select an action of a plurality of actions. In some embodiments, the one or more processors may execute the instructions to execute the selected action. In some embodiments, the one or more processors may execute the instructions to determine a value of the selected action update the action distribution policy based on the determined value, such that the action distribution policy may be improved for future iterations.

Figure 5:
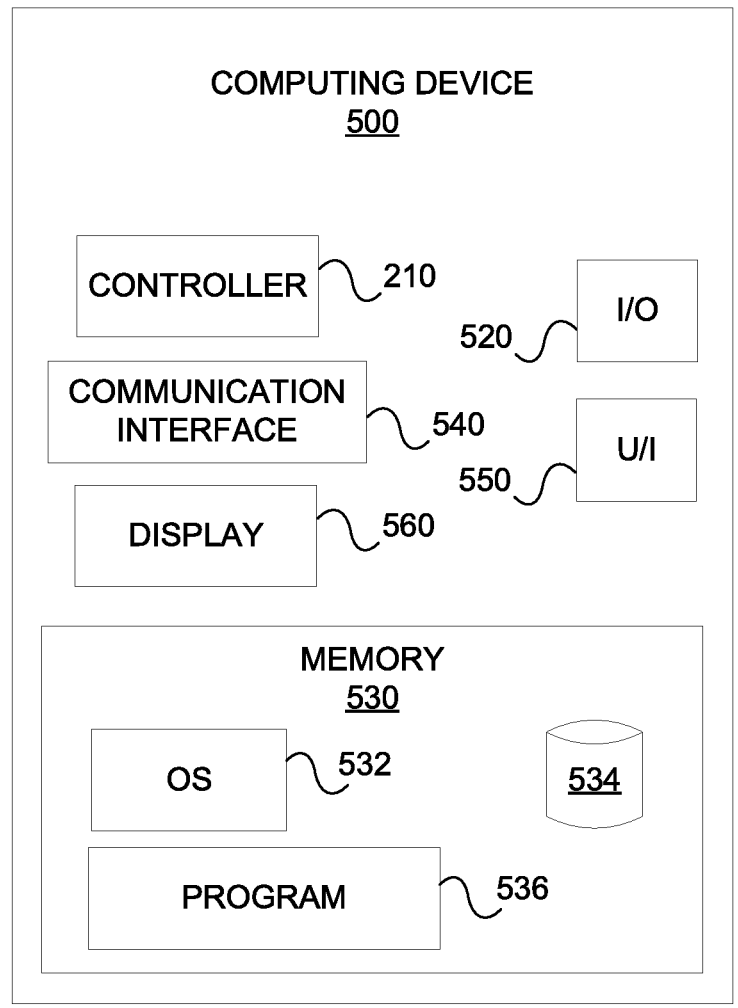
FIG. 5 is a component diagram of an example computing device, in accordance with some embodiments.

In some embodiments, the disclosed technology may include a computing device 500, which may include one or more of a mobile device, smart phone, general purpose computer, tablet computer, laptop computer, telephone, a public switched telephone network (PSTN) landline, smart wearable device, voice command device, other mobile computing device, or any other device including a controller 210 and a memory for memory module 220. An example embodiment of a computing device 500 configured to implement the system 200 is shown in more detail in FIG. 5. As shown, computing device 500 may include a controller 210 (e.g., a processor); an input/output (I/O) device 520; a memory 530, which may contain an operating system (OS) 532, a storage device 534, which may be any suitable repository of data and which may include memory module 220, and a program 536; and a communication interface 540. In some embodiments, communication interface 540 may include a transceiver. In certain embodiments, computing device 500 may include a user interface (U/I) device 550 for receiving user input data, such as data representative of a click, a scroll, a tap, a press, or typing on an input device that can detect tactile inputs. In some embodiments, computing device 500 can include a display 560.

In some embodiments, computing device 500 may include a peripheral interface, which may include the hardware, firmware, and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, Bluetooth™ low-energy (BLE) (e.g., BLE mesh and/or thread), Wi-Fi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows controller 210 to communicate with other devices via wired or wireless networks, whether local or wide area, private or public. A power source may be configured to provide an appropriate alternating current (AC) or direct current (DC) to power components.

Controller 210 may include one or more of an application specific integrated circuit (ASIC), programmable logic device, microprocessor, microcontroller, digital signal processor, co-processor or the like or combinations thereof capable of executing stored instructions and operating upon stored data. Memory 530 may include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including operating system 532, application programs 536 (including, for example, a web browser application, a widget or gadget engine, and or other applications, as necessary), executable instructions and data. In some embodiments, controller 210 may include a secure microcontroller, which may be configured to transmit and/or facilitate secure lines of communication. In some embodiments, some or all of the processing techniques described herein can be implemented as a combination of executable instructions and data within memory 530.

Controller 210 may be one or more known processing devices, such as a microprocessor from the Pentium™ family manufactured by Intel™, the Turion™ family manufactured by AMD™, or the Cortex™ family or SecurCore™ manufactured by ARM™. Processor 210 may constitute a single-core or multiple-core processor that executes parallel processes simultaneously. For example, controller 210 may be a single core processor that is configured with virtual processing technologies. In certain embodiments, controller 210 may use logical processors to simultaneously execute and control multiple processes. Controller 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Computing device 500 may include one or more storage devices 534 configured to store information used by controller 210 (or other components) to perform certain functions related to the disclosed embodiments. As an example, computing device 500 may include memory 530 that includes instructions to enable controller 210 to execute one or more applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, computing device 500 may include memory 530 that includes instructions that, when executed by controller 210, perform one or more processes consistent with the functionalities disclosed herein. Methods, systems, and articles of manufacture consistent with disclosed embodiments are not limited to separate programs or computers configured to perform dedicated tasks.

Memory 530 may include one or more memory devices that store data and instructions used to perform one or more features of the disclosed embodiments. Memory 530 may also include any combination of one or more databases controlled by memory controller devices (e.g., one or more servers, etc.) or software, such as document management systems, Microsoft™ SQL databases, SharePoint™ databases, Oracle™ databases, Sybase™ databases, or other relational databases. Memory 530 may include software components that, when executed by controller 210, perform one or more processes consistent with the disclosed embodiments. In some embodiments, memory 530 may include a memory module 220 consistent with the disclosed embodiments.

Computing device 500 may also be communicatively connected to one or more memory devices (e.g., databases (not shown)) locally or through a network. The remote memory devices may be configured to store information and may be accessed and/or managed by computing device 500. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

In example embodiments of the disclosed technology, computing device 500 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While computing device 500 has been described as one form for implementing the techniques described herein, those having ordinary skill in the art will appreciate that other functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the computing device 500 may include a greater or lesser number of components than those illustrated. Some embodiments may exclude certain components discussed herein.

Although the preceding description describes various functions of computing device 500 and particularly controller 210, in some embodiments, some or all of these functions may be carried out by multiple computing devices. For example, although FIG. 2 depicts controller 210 as executing or performing various functions, in some embodiments, some or all of the functionalities of controller 210 and/or computing device 500 may be carried out by a remote computing device 500 or another component included in computing device 500 that is separate and distinct from controller 210, such as an encoder or a different processor, for example.

Figure 6:
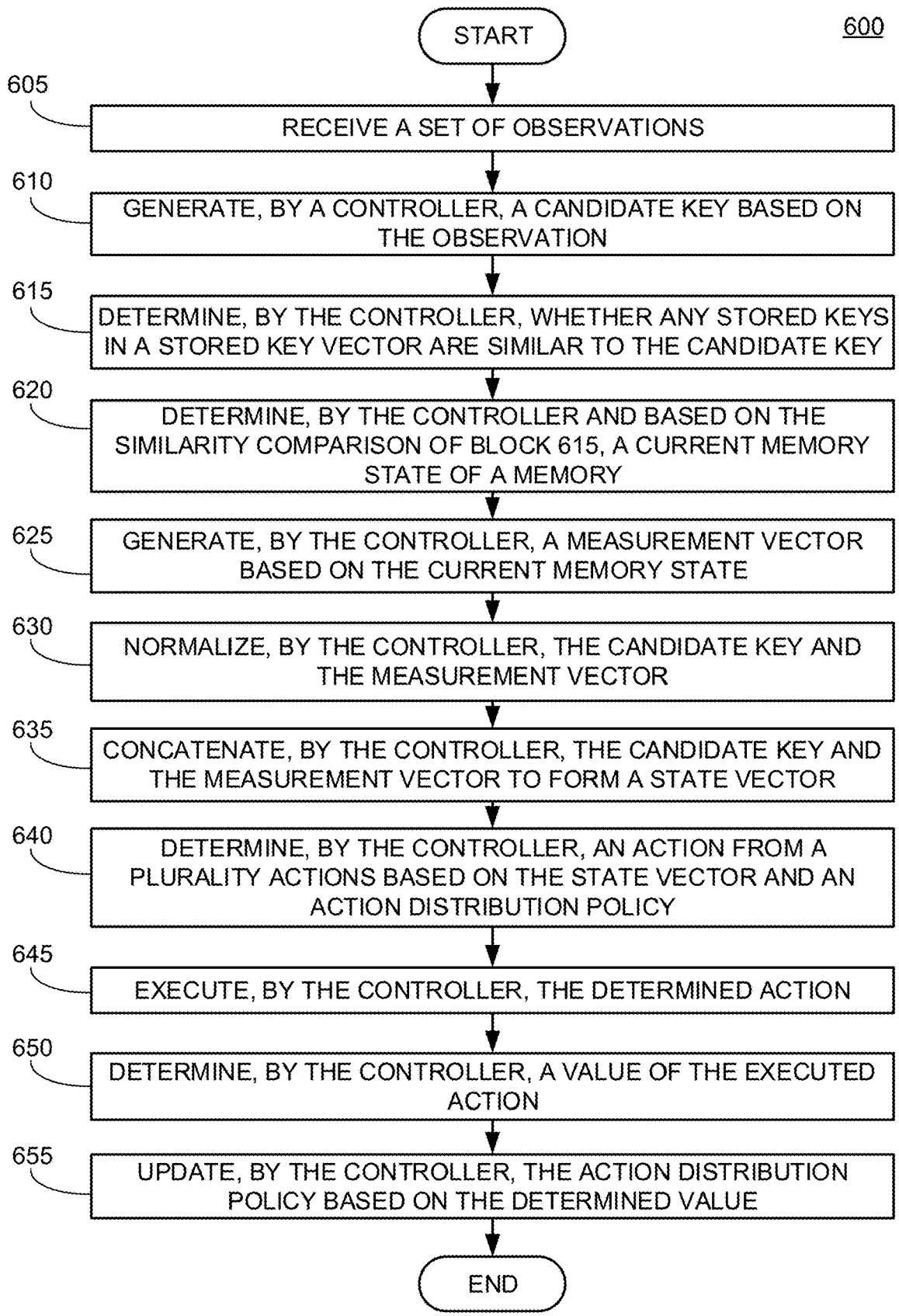
FIG. 6 is a flowchart showing operation of an example system including a learning controller, in accordance with some embodiments.

FIG. 6 shows a flowchart of a method 600 according to an example embodiment. Method 600 may be performed by one or both of computing device 500 and controller 210. As a non-limiting application, method 600 may be used to analyze a person's communications (e.g., written or verbal) to determine the person's intent or intended meaning underlying those communications. As another non-limiting application, method 600 may be to analyze one or more images to identify a person or a class of persons depicted in some or all of the images. As will be appreciated, method 600 may be used to categorize input information into a plurality of classes or categories. Accordingly, method 600 may be useful for any application in which input data is categorized into available or newly added classes or categories.

In block 605, method 600 may include receiving (e.g., by controller 210) a set of observations. In block 610, method 600 may include generating a candidate key based on the set of observations. In block 615, method 600 may include determining, by the controller, whether any stored keys in a key vector (e.g., key vector 222) are similar to the candidate key. The key vector may be stored in memory (e.g., memory module 220), and in some embodiments, the memory may additionally include a class label vector (e.g., value vector 224) and/or an age vector (e.g., age vector 226) indicative of an age of a corresponding key vector and/or an elapsed time since the corresponding key vector was last updated.

In block 620, method 600 may include determining a current memory state of a memory (e.g., memory module 220). In some embodiments, determining a current memory state of a memory may be based on the determined similarity of the stored keys to the candidate key. In some embodiments, determining the current memory state of the memory may include determining an average vector based on all stored keys having a similarity to the candidate key that is above a predetermined threshold. In some embodiments, determining the current memory state of the memory may include determining a memory state scalar based on the average vector, and in block 625, method 600 may include generating a measurement vector based on the memory state (e.g., the memory state scalar). In block 630, method 600 may include normalizing the candidate key and the measurement vector, and in block 635, method 600 may include concatenating the candidate key and the measurement vector.

In block 640, method 600 may include determining, based on the state vector and an action distribution policy, an action from a plurality of actions. In some embodiments, determining the action may include determining that the action maximized a reduction in entropy of a system as compared to the remaining actions of the plurality of actions. In block 645, method 600 may include executing the determined action.

In block 650, method 600 may include determining a value of executed action. In some embodiments, determining the value may include determining an expected return value for selecting the executed action in a state corresponding to the state vector and following the action distribution policy. In some embodiments, the expected return value may be approximated with parameters, and method 600 can include computing updates to the parameters by minimizing a loss function. In block 655, method 600 can include updating the action distribution policy based on the determined value. In some embodiments, the action distribution policy can be updated by updating the parameters.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described herein with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described herein with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Exemplary Use Cases

The following exemplary use cases describe examples of a typical system flow pattern. They are intended solely for explanatory purposes and not in limitation. The system can determine a class of inputted data and can dynamically add new classes without requiring traditional retraining of the model.

The system (e.g., system 200) can receive a set of observations (e.g., input data x 202). For example, they system may receive pieces of conversation (e.g., data representative of utterances containing sequences of spoken or written words), and the goal of the system may be to determine the speakers' intents underlying those utterances. Thus, the utterances are the observations, and the intents are the labels or classes. As another example, the observations can include image data (e.g., data indicative of pixels in a picture or video), and the class can be the identification of a person depicted in the picture.

The system (e.g., via controller 210) can generate a candidate key (e.g., embedding vector q 203) based on the set of observations. The system can include a memory module (e.g., memory module 220) that can include a key vector (e.g., key vector 222), a class label vector (e.g., value vector 224), and an age vector (e.g., age vector 226) indicative of an age of the corresponding key vector. The system can determine whether any of the stored keys in the key vector are similar to the candidate key, and if any of the stored keys are above a predetermined threshold of similarity of with respect to the candidate key, the system can average those matching stored keys to determine a current memory state (e.g., current memory state z 204) of the memory module 220, and the system can generate a measurement vector (e.g., measurement vector p 205) based on the current memory state. The system can normalize the candidate key and measurement vector, and the system can concatenate the candidate key and measurement vector to form a state vector (e.g., state vector 206).

The system can then choose and execute one or more actions from a plurality of actions that maximizes a reduction in entropy as compared to the remaining actions. The system can determine this by computing a policy function (e.g., policy function $V^\pi$ 212) applying the state vector to an action distribution policy (e.g., policy $\pi$). The action distribution policy can dictate a distribution of actions based on parameters (e.g., parameters $\theta$). If the system decides to insert (e.g., insert 306), the system can add a new key to the key vector and can add the corresponding class label to the class label vector. As will be appreciated, the class label can be presented or input during training, as every observation is labeled during training. Subsequent to training, classes, such as new classes may be represented by a numeric identifier, such that new classes may be represented by incremental increases in numeric value. In some embodiments, other identifiers may be used. If the system decides to update, after retrieving the keys most similar to the candidate key, the system can average the most similar keys with the candidate key, moving the most similar keys in the directions of the candidate key. If the system decides to read, after retrieving the keys most similar to the candidate key, the system can provide the most similar keys without modifying the memory state of the key vector. Regardless of the action chosen by the system, the system can set the corresponding age vector index to zero to indicate that the corresponding key vector index has recently been inserted, updated, or read.

Subsequent to executing the determined action, the system can determine a value (or success) of the determined action. The system can determine the value of the determined (and executed) action by computing the expected total reward at the particular state vector. The system can then update the parameters of the action distribution policy, which may provide an improved action distribution policy for future iterations involve future sets of observations.

We claim:
1. A system comprising:
a processor; and
memory having stored thereon:
  a hash key vector and a label vector associated with the hash key vector; and
  instructions that, when executed by the processor, cause the system to:
    encode received data into an input data vector;
    measure a current state of the memory;
    convert the measured current state of the memory into a memory state vector;
    identify one or more saved keys of the hash key vector that are within a predetermined similarity to a candidate key, the candidate key being based at least in part on the input data vector, wherein the predetermined similarity is calculated based on a cosine distance algorithm;

perform an entropy reduction estimation comprising:
for at least one of the one or more identified saved keys, determining a first estimated entropy associated with reading the at least one of the one or more identified saved keys;
for the at least one of the one or more identified saved keys, determining, based on a comparison of the candidate key to the at least one of the one or more identified saved keys, a second estimated entropy associated with updating the at least one of the one or more identified saved keys to include data indicative of the candidate key; and
determining a third estimated entropy associated with inserting a new key indicative of the candidate key; and
execute, based at least in part on the entropy reduction estimation, one of reading the at least one of the one or more identified saved keys, updating the at least one of the one or more identified saved keys to include data indicative of the candidate key, and inserting a new key indicative of the candidate key.

2. The system of claim 1, wherein the system is configured to encode the received data using a convolutional neural network.

3. The system of claim 1, wherein the system is configured to measure a current state of the memory using a multi-layer perceptron network.

4. The system of claim 1, wherein the instructions, when executed by the processor, further cause the system to:
prior to querying the memory for any saved keys that are within the predetermined similarity to the candidate key:
normalize the input data vector and the memory state vector; and
concatenate the input data vector and the memory state vector to create a state vector.

5. The system of claim 1, wherein the instructions, when executed by the processor, further cause the system to, prior to performing the entropy reduction estimation, identify a single saved key that is most similar to the candidate key.

6. The system of claim 1, wherein the instructions, when executed by the processor, further cause the system to perform the entropy reduction estimation for each of the one or more identified saved keys that is above the predetermined similarity to the candidate key.

7. The system of claim 1, wherein the instructions, when executed by the processor, further cause the system to determine, based at least in part on a calculation of a back-propagation algorithm, a reduction in entropy in the system.

8. The system of claim 1, wherein inserting a new key comprises adding the new key to the hash key vector and adding a new label to the label vector, the new label being associated with the new key.

9. The system of claim 1, wherein updating the at least one of the one or more identified saved keys to include data indicative of the candidate key comprises averaging a plurality of most similar saved keys and the candidate key to generate an updated key and replacing an oldest key among the one or more identified saved keys with the updated key.

10. The system of claim 1, wherein updating the at least one of the one or more identified saved keys to include data indicative of the candidate key comprises averaging a single most similar saved key and the candidate key to generate an updated key and replacing the single most similar saved key with the updated key.

11. The system of claim 1, wherein
the memory further comprises an age vector associated with the hash key vector, and
the instructions, when executed by the processor, further cause the system to:
increment the age vector by one each time a controller executes a query function associated with the hash key vector; and
set the age vector equal to zero each time the controller executes an update function associated with the hash key vector or an insert function associated with the hash key vector.

12. A method comprising:
receiving a set of observations;
generating a candidate key based on the set of observations;
determining whether any stored keys in a stored key vector are similar to the candidate key by:
determining an average vector of the stored keys in the stored key vector; and
determining that the average vector has a similarity to the candidate key that is above a predetermined threshold, wherein the similarity is determined based on a cosine distance algorithm; and
determining a memory state scalar based on the average vector;
determining, based on the determined similarity of stored keys to the candidate key, a current memory state of a memory comprising the stored key vector;
generating a measurement vector based on the current memory state wherein the measurement vector is based on the memory state scalar;
normalizing the candidate key and the measurement vector;
concatenating the candidate key and the measurement vector to form a state vector;
determining, based on the state vector and an action distribution policy, an action of a plurality of actions; and
executing the determined action;
determining an expected return value for executing the determined action in a state corresponding to the state vector and following the action distribution policy by:
approximating the expected return value based on weights of a neural network implementing a controller configured to execute the method;
minimizing a loss function associated with execution of the determined action;
determining an update to the action distribution policy based on the minimized loss function, wherein updating the action distribution policy comprises updating the action distribution policy to include the update; and
updating, based on the expected return value, the action distribution policy.

* * * * *